United States Patent
Dimpsey et al.

(10) Patent No.: US 7,114,150 B2
(45) Date of Patent: Sep. 26, 2006

(54) APPARATUS AND METHOD FOR DYNAMIC INSTRUMENTING OF CODE TO MINIMIZE SYSTEM PERTURBATION

(75) Inventors: Robert Tod Dimpsey, Austin, TX (US); Frank Eliot Levine, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 10/365,991

(22) Filed: Feb. 13, 2003

(65) Prior Publication Data
US 2004/0163077 A1 Aug. 19, 2004

(51) Int. Cl.
*G06F 9/44* (2006.01)
(52) U.S. Cl. ..................................... 717/131
(58) Field of Classification Search ......... 717/128–135
See application file for complete search history.

(56) References Cited

U.S. PATENT DOCUMENTS

| | | | |
|---|---|---|---|
| 5,940,618 A | 8/1999 | Blandy et al. | 395/704 |
| 6,002,872 A | 12/1999 | Alexander, III et al. | 395/704 |
| 6,055,492 A | 4/2000 | Alexander, III et al. | 702/179 |
| 6,158,024 A | 12/2000 | Mandal | 714/37 |
| 6,311,325 B1 | 10/2001 | Levine et al. | 717/4 |
| 6,338,159 B1 | 1/2002 | Alexander, III et al. | 717/4 |
| 6,470,492 B1 * | 10/2002 | Bala et al. | 717/128 |
| 6,662,359 B1 * | 12/2003 | Berry et al. | 717/130 |
| 2004/0103401 A1 * | 5/2004 | Chilimbi et al. | 717/130 |

OTHER PUBLICATIONS

Kazi et al., "JaViz: A client/server Java profiling tool", 2000, IBM Systems Journal, vol. 39, No. 1, pp. 96-117.*

"Proceedings of the Java Virtual Machine Research and Technology Symposium", USENIX, Apr. 2001.*

Merten et al., "A Hardware-Driven Profiling Scheme for Identifying Program Hot Spots to Support Runtime Optimization", IEEE, 1999.*

(Continued)

*Primary Examiner*—Kakali Chaki
*Assistant Examiner*—Trenton J. Roche
(74) *Attorney, Agent, or Firm*—Duke W. Yee; Herman Rodriguez; Brian D. Owens

(57) ABSTRACT

An apparatus and method are provided for the dynamic instrumentation of code to minimize system perturbation during tracing of the execution of the code. With the apparatus and method, "hot spots" in the execution of the code are dynamically determined during tracing of the execution of the code. These "hot spots" are dynamically instrumented, i.e. an event hook is inserted, to cause control to be passed to a handler that determines a caller of the "hot spot" method. The method that called the "hot spot" method, or "caller" method, is identified from a call stack and is dynamically instrumented for an appropriate metric so that the next time the calling method is executed, the dynamically inserted hooks are executed. The execution of the hooks in the caller method is continued for a predetermined period, e.g., number of invocations, to get an understanding of the caller method's characteristics. A list of callers of instrumented methods is maintained and used to determine one or more calling methods of the instrumented caller method. One or more of these calling methods may be instrumented and the hooks inserted in the instrumented caller method (called by the one or more calling methods), are removed. In this way, the call graph of the hot spots of a program execution is "walked up" and characterized over time.

19 Claims, 7 Drawing Sheets

OTHER PUBLICATIONS

"The Java HotSpot Performance Engine Architecture", Apr. 1999.*

U.S. Appl. No. 09/418,378 AT9-99-487, Berry et al., Method and System for Periodic Trace Sampling for Real-Time Generation of Segments of Call Stack Trees Augmented with Call Stack Position Determination, Oct. 14, 1999.

U.S. Appl. No. 09/418,379 AT9-99-489, Berry et al., Method and System for Periodic Trace Sampling for Real-Time Generation of Segments of Call Stack Trees, Oct. 14, 1999.

U.S. Appl. No. 09/460,850 AT9-99-727, Berry et al., Minimizing Profiling-Related Perturbation Using Periodic Contextual Information, Dec. 14, 1999.

U.S. Appl. No. 09/393,083 AT9-99-308, Alexander, III et al., Method and System for Detecting and Recovering From Errors in Trace Data, Sep. 9, 1999.

U.S. Appl. No. 09/343,439 AT9-98-849, Alexander, III et al., Process and System for Merging Trace Data for Primarily Interpreted Methods, Jun. 30, 1999.

U.S. Appl. No. 09/343,438 AT9-98-850, Alexander, III et al., Method and System for Merging Event-Based Data and Sampled Data into Postprocessed Trace Output, Jun. 30, 1999.

* cited by examiner

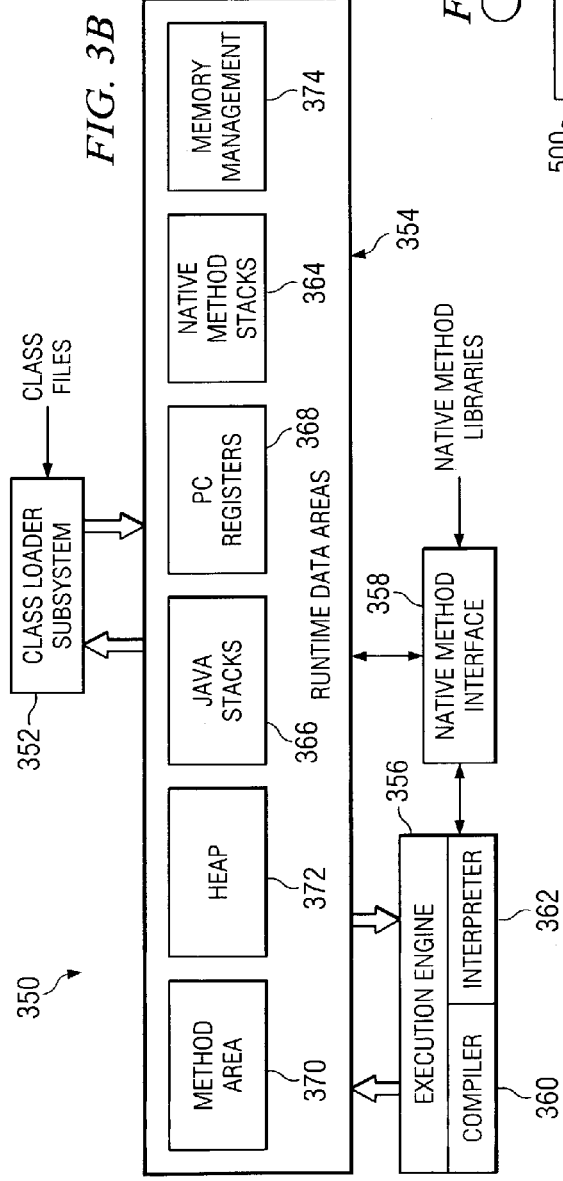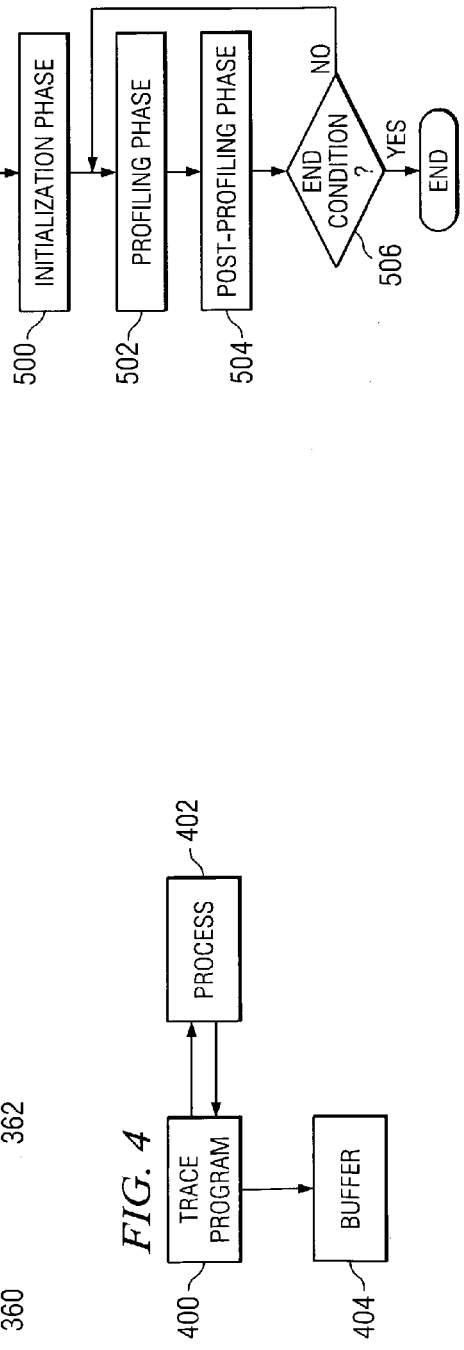

| TIMESTAMP | EVENT | CALL STACK AFTER EVENT |
|---|---|---|
| 0 | ENTER C | C |
| 1 | ENTER A | CA |
| 2 | ENTER B | CAB |
| 3 | EXIT FROM B | CA |
| 4 | ENTER B | CAB |
| 5 | ENTER B | CABB |
| 6 | EXIT FROM B | CAB |
| 7 | EXIT FROM B | CA |
| 8 | EXIT FROM A | C |
| 9 | ENTER B | CB |
| 10 | ENTER A | CBA |
| 11 | ENTER B | CBAB |
| 12 | ENTER A | CBABA |
| 13 | EXIT FROM A | CBAB |
| 14 | EXIT FROM B | CBA |
| 15 | ENTER X | CBAX |
| 16 | EXIT FROM X | CBA |
| 17 | EXIT FROM A | CB |
| 18 | EXIT FROM B | C |
| 19 | EXIT FROM C |  |

*FIG. 10*

APPARATUS AND METHOD FOR DYNAMIC INSTRUMENTING OF CODE TO MINIMIZE SYSTEM PERTURBATION

BACKGROUND OF THE INVENTION

1. Technical Field

The present invention is directed to an improved apparatus and method for performing traces of program execution. More specifically, the present invention is directed to an apparatus and method for dynamic insertion of hooks into program code in order to trace the execution of the program code with minimal system perturbation.

2. Description of Related Art

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules which allocate the largest amount of memory or perform the most I/O requests. Hardware performance tools may be built into the system or added at a later point in time.

Software performance tools also are useful in data processing systems, such as personal computer systems, which typically do not contain many, if any, built-in hardware performance tools. One known software performance tool is a trace tool. A trace tool may use more than one technique to provide trace information that indicates execution flows for an executing program.

One technique keeps track of particular sequences of instructions by logging certain events as they occur, so-called event-based profiling technique. For example, a trace tool may log every entry into, and every exit from, a module, subroutine, method, function, or system component. Alternately, a trace tool may log the requester and the amounts of memory allocated for each memory allocation request. Typically, a time-stamped record is produced for each such event. Corresponding pairs of records similar to entry-exit records also are used to trace execution of arbitrary code segments, starting and completing I/O or data transmission, and for many other events of interest.

Event-based profiling tends to perturb the computing system and possibly invalidate results of the trace of the program execution. The perturbation of computing systems is due to the expense in handling too many events. That is, because hooks, which are used to generate events in event-based profiling, must be inserted into the code of the program before the workload of the program is executed, it is not known where the hooks should be placed. That is, since the trace tool or programmer does not know a priori, the path of the workload, all possible paths must be covered by the insertion of hooks. As a result, many more hooks are encountered during the execution and trace of the program than may be necessary to obtaining an understanding of the program execution.

In some cases, hooks in a program under trace may be turned on and off. However, in such cases, either all of the hooks are turned on, or all of the hooks are turned off. As a result, while the workload of the program can run unperturbed when not being traced, when the events are turned on for tracing, the perturbation begins and different performance results may be obtained by the trace than are actually experienced when the hooks are turned off.

In still other cases, certain ones of the hooks in a program under trace may be turned on while others are turned off. For example, only hooks on selected threads may be turned on while all other hooks are turned off. However, with such systems, there is considerable overhead in determining whether a hook is to be executed or not, i.e. whether the hook is turned on or off, that results in performance penalties.

Executing hooks frequently causes a significant amount of perturbation. For example, Java profiling using the Java Virtual Machine Profiler Interface (JVMPI) for method entries and exits tends to slow applications from 2 to 30 times.

One approach to avoiding the overhead of execution of hooks during tracing of a program is to execute fewer hooks. However, in this case, all the possible paths of execution are not hooked and thus, important paths of execution may be missed. That is, if the number of hooks is reduced, so is the information that is obtained during the trace.

Therefore, it would be advantageous to have an apparatus and method for tracing the execution of a program in which the number of hooks executed during the trace is kept to a minimum without losing information regarding important paths of execution of the program. It would further be advantageous to have an apparatus and method for tracing the execution of a program in which hooks are inserted into and removed from the paths of execution of a program dynamically so as to maintain the number of hooks at a minimum level.

SUMMARY OF THE INVENTION

The present invention provides an apparatus and method for the dynamic instrumentation of code and removal of instrumented code to minimize system perturbation during tracing of the execution of the code. With the apparatus and method of the present invention, "hot spots" in the execution of the code are dynamically determined during tracing of the execution of the code. These "hot spot" methods or routines (hereafter collectively referred to as "methods") are dynamically instrumented, i.e. an event hook is inserted, to cause control to be passed to a handler that determines a caller of the "hot spot" method.

The method that called the "hot spot" method, hereafter referred to as the "caller" method, is identified from a call stack and is dynamically instrumented so that the next time the calling method is executed, the dynamically inserted hooks are executed. The execution of the hooks in the caller method is continued for a predetermined period, e.g., number of invocations, to get an understanding of the caller method's characteristics.

The present invention maintains a list of callers of instrumented methods. When the predetermined period for executing inserted hooks in a caller method has expired, the list of callers is used to determine one or more calling methods of the instrumented caller method. One or more of these calling methods in the call stack are then instrumented and the hooks inserted in the instrumented caller method (called by the one or more calling methods), are removed. In this way, the call graph of the hot spots of a program execution is "walked up" and characterized over time.

Thus, with the present invention, the number of hooks that are executed during tracing of a program is minimized by reducing the number of hooks required to be inserted prior to the workload being executed and keeping the number of hooks that are dynamically inserted to a minimum. The number of hooks that are dynamically inserted is minimized by performing dynamic instrumentation based on detected hot spots and by removing inserted hooks from methods when one of its calling methods is instrumented.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3B is an exemplary block diagram depicting a Java virtual machine in accordance with a preferred embodiment of the present invention;

FIG. 4 is an exemplary block diagram depicting components used to profile processes in a data processing system;

FIG. 5 is an exemplary diagram illustrating various phases in profiling the active processes in an operating system;

FIG. 10 is a diagram depicting an exemplary program execution sequence along with the state of the call stack at each function entry/exit point;

DETAILED DESCRIPTION OF THE PREFERRED EMBODIMENT

Figure 1:
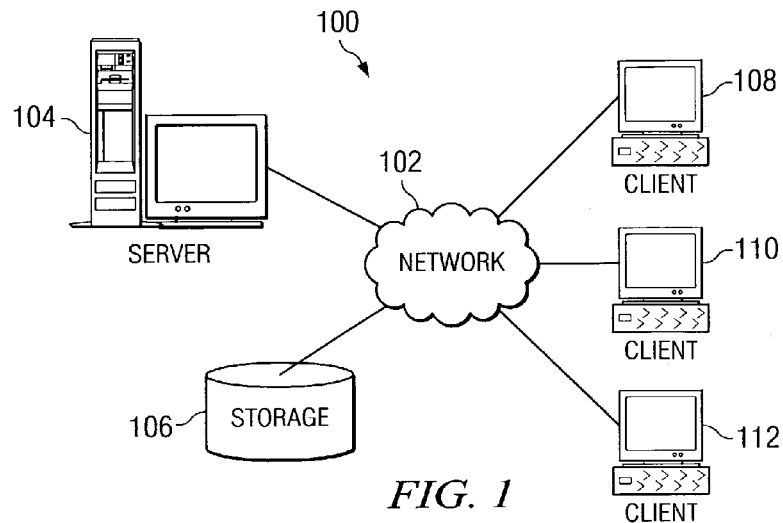
FIG. 1 depicts a distributed data processing system in which the present invention may be implemented.

With reference now to the figures, and in particular with reference to FIG. 1, a pictorial representation of a distributed data processing system in which the present invention may be implemented is depicted. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention. Many modifications to the system shown in FIG. 1 may be made without departing from the spirit and scope of the present invention.

Figure 2A:
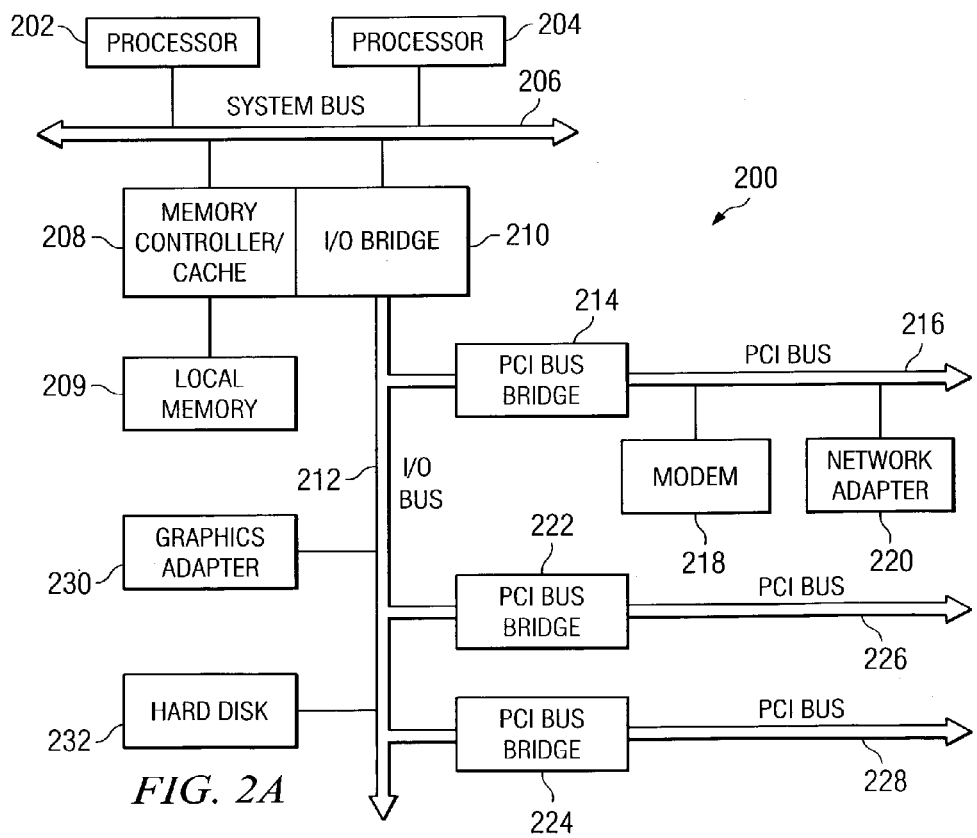
FIGS. 2A–B are exemplary block diagrams depicting a data processing system in which the present invention may be implemented.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention. The data processing system depicted in FIG. 2A may be, for example, an IBM RISC/System 6000 system, a product of International Business Machines Corporation in Armonk, N.Y., running the Advanced Interactive Executive (AIX) operating system.

Figure 2B:
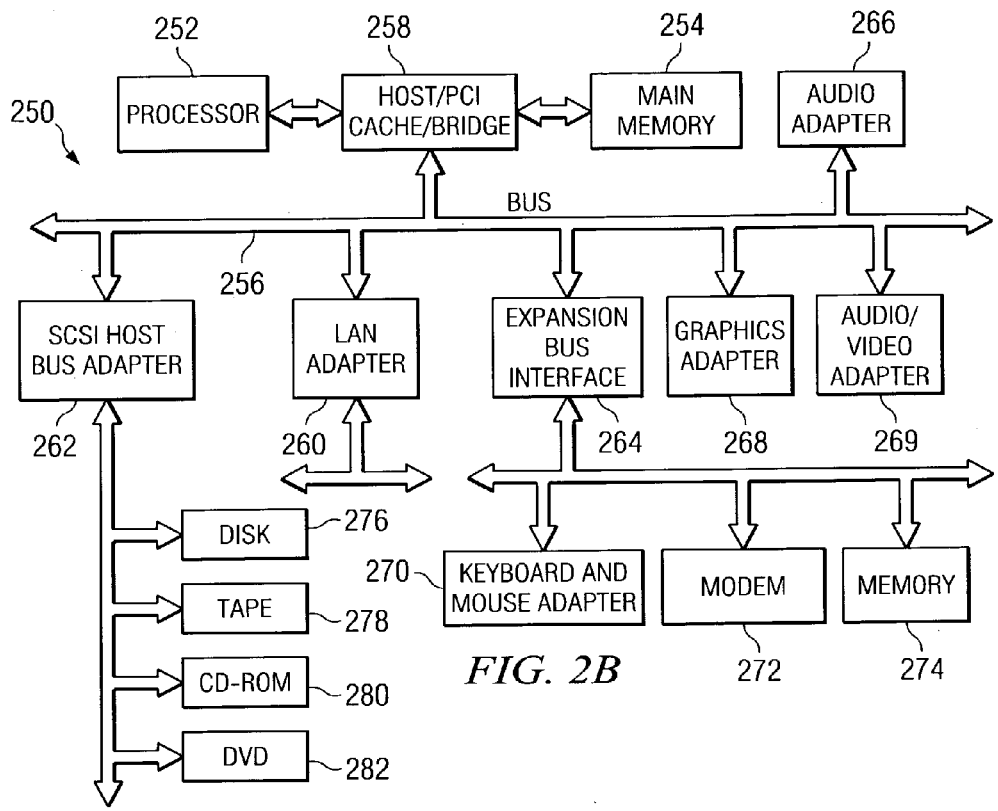

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards.

In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as Windows NT™ or Windows 2000™, which are available from Microsoft Corporation™.

An object oriented programming system such as Java may run in conjunction with the operating system and may provide calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides a process and system for profiling, e.g., tracing, software applications. Although the present invention may operate on a variety of computer platforms and operating systems, it may also operate within a Java runtime environment. Hence, the present invention may operate in conjunction with a Java virtual machine (JVM) yet within the boundaries of a JVM as defined by Java standard specifications. In order to provide a context for the present invention, portions of the operation of a JVM according to Java specifications are herein described.

Figure 3A:
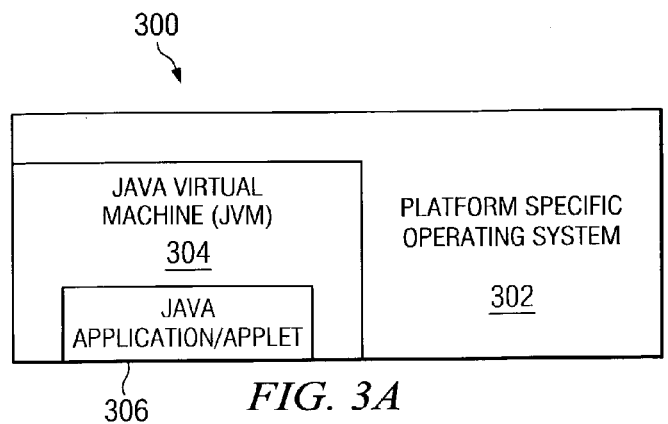
FIG. 3A is an exemplary block diagram depicting the relationship of software components operating within a computer system that may implement the present invention.

With reference now to FIG. 3A, a block diagram is provided that illustrates the relationship of software components operating within a computer system that may implement the present invention. Java-based system 300 contains platform specific operating system 302 that provides hardware and system support to software executing on a specific hardware platform. JVM 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded picoJava core.

At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Byte codes may be translated into native code by a just-in-time compiler or JIT.

A JVM must load class files and execute the bytecodes within them. The JVM contains a class loader, which loads class files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

Interpreting code provides an additional benefit. Rather than instrumenting the Java source code, the interpreter may be instrumented. Trace data may be generated via selected events and timers through the instrumented interpreter without modifying the source code. Profile instrumentation is discussed in more detail further below.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

With reference now to FIG. 3B, a block diagram of a JVM is depicted in accordance with a preferred embodiment of the present invention. JVM 350 includes a class loader subsystem 352, which is a mechanism for loading types, such as classes and interfaces, given fully qualified names. JVM 350 also contains runtime data areas 354, execution engine 356, native method interface 358, and memory management 374. Execution engine 356 is a mechanism for executing instructions contained in the methods of classes loaded by class loader subsystem 352. Execution engine 356 may be, for example, Java interpreter 362 or just-in-time compiler 360. Native method interface 358 allows access to resources in the underlying operating system. Native method interface 358 may be, for example, a Java native interface.

Runtime data areas 354 contain native method stacks 364, Java stacks 366, PC registers 368, method area 370, and heap 372. These different data areas represent the organization of memory needed by JVM 350 to execute a program.

Java stacks 366 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values; any Java instruction that requires or produces an intermediate value uses the stack for holding the intermediate values. In this manner, the Java instruction set is well-defined for a variety of platform architectures.

PC registers 368 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined.

Native method stacks 364 store the state of invocations of native methods. The state of native method invocations is stored in an implementation-dependent way in native method stacks, registers, or other implementation-dependent memory areas. In some JVM implementations, native method stacks 364 and Java stacks 366 are combined.

Method area 370 contains class data while heap 372 contains all instantiated objects. The JVM specification strictly defines data types and operations. Most JVMs choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 372. JVM 350 includes an instruction that allocates memory space within the memory for heap 372 but includes no instruction for freeing that space within the memory. Memory management 374 in the depicted example manages memory space within the memory allocated to heap 370. Memory management 374 may include a garbage collector which automatically reclaims memory used by objects that are no longer referenced. Additionally, a garbage collector also may move objects to reduce heap fragmentation.

With reference now to FIG. 4, a block diagram depicts components used to profile processes in a data processing system. A trace program 400 is used to profile processes 402. Trace program 400 may be used to record data upon the execution of a hook, which is a specialized piece of code at a specific location in a routine or program in which other routines may be connected. Trace hooks are typically inserted for the purpose of debugging, performance analysis, or enhancing functionality. These trace hooks are employed to send trace data to trace program 400, which stores the trace data in buffer 404. The trace data in buffer 404 may be subsequently stored in a file for post-processing, or the trace data may be processed in real-time.

With Java operating systems, the present invention employs trace hooks that aid in identifying methods that may be used in processes 402. In addition, since classes may be loaded and unloaded, these changes may also be identified using trace data. This is especially relevant with "network client" data processing systems, such as those that may operate under JavaOS, since classes and jitted methods may be loaded and unloaded more frequently due to the constrained memory and role as a network client. Note that class load and unload information is also relevant in embedded application environments, which tend to be memory constrained.

With reference now to FIG. 5, a diagram depicts various phases in profiling the processes active in an operating system. Subject to memory constraints, the generated trace output may be as long and as detailed as the analyst requires for the purpose of profiling a particular program.

An initialization phase 500 is used to capture the state of the client machine at the time tracing is initiated. This trace initialization data includes trace records that identify all existing threads, all loaded classes, and all methods for the loaded classes. Records from trace data captured from hooks are written to indicate thread switches, interrupts, and loading and unloading of classes and jitted methods. Any class which is loaded has trace records that indicate the name of the class and its methods. In the depicted example, four byte IDs are used as identifiers for threads, classes, and methods. These IDs are associated with names that have been output in the records. A record is written to indicate when all of the start up information has been written.

Next, during the profiling phase 502, trace records are written to a trace buffer or trace file. In the present invention, a trace buffer may have a combination of types of records, such as those that may originate from a trace hook executed in response to a particular type of event, e.g., a method entry or method exit, and those that may originate from a stack walking function executed in response to a timer interrupt, e.g., a stack unwind record, also called a call stack record.

For example, the following process may occur during the profiling phase if the user of the profiling utility has requested sample-based profiling information. Each time a particular type of timer interrupt occurs, a trace record is written, which indicates the system program counter. This system program counter may be used to identify the routine that is interrupted. In the depicted example, a timer interrupt is used to initiate gathering of trace data. Of course, other types of interrupts may be used other than timer interrupts. Interrupts based on a programmed performance monitor event or other types of periodic events may be employed.

In the post-processing phase 504, the data collected in the trace buffer is sent to a trace file for post-processing. In one configuration, the file may be sent to a server, which determines the profile for the processes on the client machine. Of course, depending on available resources, the post-processing also may be performed on the client machine. In post-processing phase 504, B-trees and/or hash tables may be employed to maintain names associated with the records in the trace file to be processed. A hash table employs hashing to convert an identifier or a key, meaningful to a user, into a value for the location of the corresponding data in the table. While processing trace records, the B-trees and/or hash tables are updated to reflect the current state of the client machine, including newly loaded jitted code or unloaded code. Also, in the post-processing phase 504, each trace record is processed in a serial manner. As soon as the indicator is encountered that all of the startup information has been processed, trace records from trace hooks and trace records from timer interrupts are then processed. Timer interrupt information from the timer interrupt records are resolved with existing hash tables. In addition, this information identifies the thread and function being executed. The data is stored in hash tables with a count identifying the number of timer tick occurrences associated with each way of looking at the data. After all of the trace records are processed, the information is formatted for output in the form of a report.

Alternatively, trace information may be processed on-the-fly so that trace data structures are maintained during the profiling phase. In other words, while a profiling function, such as a timer interrupt, is executing, rather than (or in addition to) writing trace records to a buffer or file, the trace record information is processed to construct and maintain any appropriate data structures. In such an embodiment, a determination is made as to whether an end condition has occurred (step 506). If the end condition occurs, i.e. stopping of the trace, then the operation terminates. Otherwise, the operation returns to step 502 and continues the profiling of the program execution and post-profiling operations to generate trace data structures.

For example, during the processing of a timer interrupt during the profiling phase, a determination could be made as to whether the code being interrupted is being interpreted by the Java interpreter. If the code being interrupted is interpreted, the method ID of the method being interpreted may be placed in the trace record. In addition, the name of the method may be obtained and placed in the appropriate B-tree. Once the profiling phase has completed, the data structures may contain all the information necessary for generating a profile report without the need for post-processing of the trace file.

Figure 6:
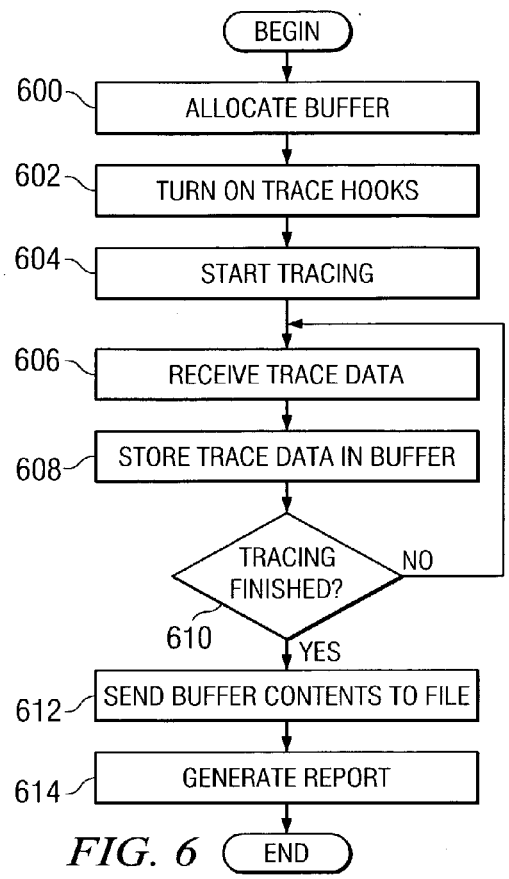
FIG. 6 is a flowchart outlining an exemplary process used by a trace program for generating trace records from processes executing on a data processing system.

With reference now to FIG. 6, a flowchart depicts a process used by a trace program for generating trace records from processes executing on a data processing system. FIG. 6 provides further detail concerning the generation of trace records that were not described with respect to FIG. 5.

Trace records may be produced by the execution of small pieces of code called "hooks". Hooks may be inserted in various ways into the code executed by processes, including statically (source code) and dynamically (through modification of a loaded executable). This process is employed after trace hooks have already been inserted into the process or processes of interest. The process begins by allocating a buffer (step 600), such as buffer 404 in FIG. 4. Next, in the depicted example, trace hooks are turned on (step 602), and tracing of the processes on the system begins (step 604). Trace data is received from the processes of interest (step 606). This type of tracing may be performed during phases 500 and/or 502. This trace data is stored as trace records in the buffer (step 608). A determination is made as to whether tracing has finished (step 610). Tracing finishes when the trace buffer has been filled or the user stops tracing via a command and requests that the buffer contents be sent to file. If tracing has not finished, the process returns to step 606 as described above.

Otherwise, when tracing is finished, the buffer contents are sent to a file for post-processing (step 612). A report is then generated in post-processing (step 614) with the process terminating thereafter.

Figure 7:
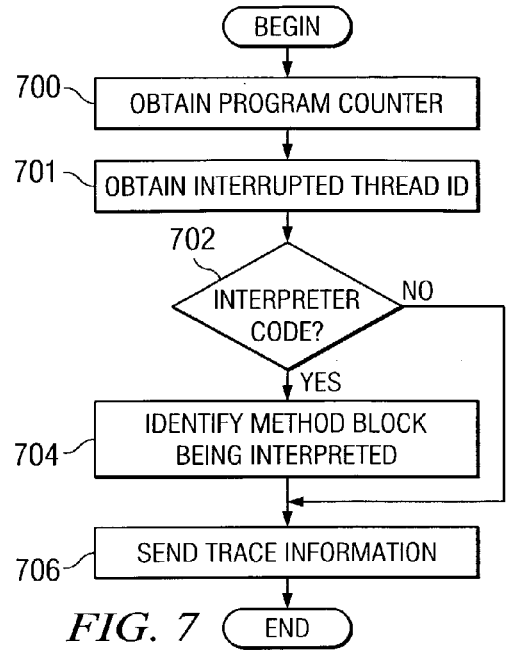
FIG. 7 is a flowchart outlining an exemplary process used in a system interrupt handler trace hook.

With reference now to FIG. 7, a flowchart depicts a process that may be used during an interrupt handler trace hook.

The process begins by obtaining a program counter (step 700). Typically, the program counter is available in one of the saved program stack areas. Thereafter, a determination is made as to whether the code being interrupted is interpreted code (step 702). This determination may be made by determining whether the program counter is within an address range for the interpreter used to interpret bytecodes.

If the code being interrupted is interpreted, a method block address is obtained for the code being interpreted (step 704). The method block address may be obtained, for example, from the information obtained by the sampling code of the program trace.

That is, the Java profiler and sampling code are configured such that, for each thread created, the profiler obtains control (via the JVMPI) and requests a work area from the sampling code for placing the method block address for the thread. The sampler returns a pointer which is passed back to the profiler. The profiler then informs the Java Virtual Machine where to write the method block address when it starts interpreting the method. The profiler obtains control when the thread is destroyed and tells the sampling code that the thread work area is no longer required.

A trace record is then written (step 706). The trace record is written by sending the trace information to a trace program, such as trace program 400, which generates trace records for post-processing in the depicted example. This trace record is referred to as an interrupt record, or an interrupt hook.

This type of trace may be performed during phase 502. Alternatively, a similar process, i.e. determining whether code that was interrupted is interpreted code, may occur during post-processing of a trace file.

Figure 9:
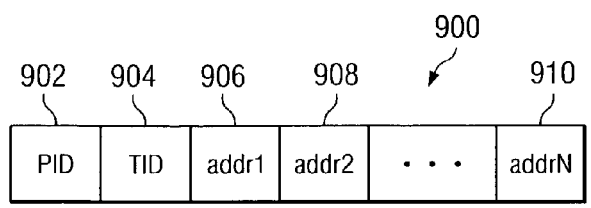
FIG. 9 is an illustration depicting an exemplary call stack entry.
Figure 8:
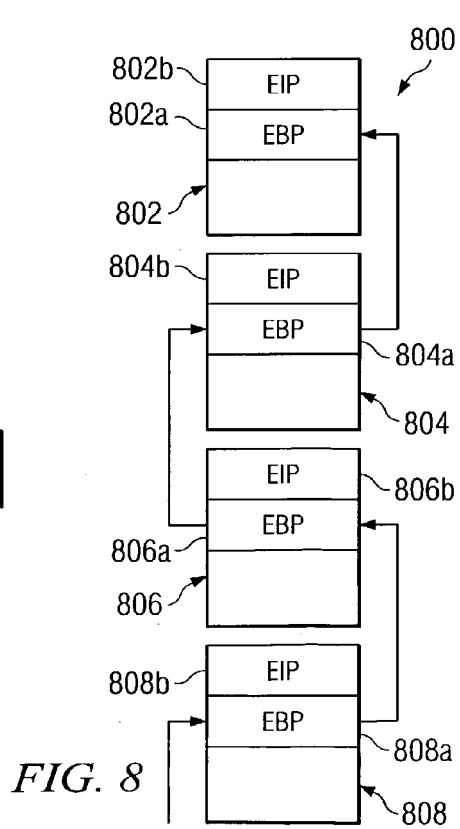
FIG. 8 is an exemplary diagram depicting the call stack containing stack frames.

A set of processes may be employed to obtain sample-based profiling information. As applications execute, the applications may be periodically interrupted in order to obtain information about the current runtime environment. This information may be written to a buffer or file for post-processing, or the information may be processed on-the-fly into data structures representing an ongoing history of the runtime environment. FIGS. 8 and 9 describe sample-based profiling in more detail.

A sample-based profiler may obtain information from the stack of an interrupted thread. The thread is interrupted by a software timer interrupt available in many operating systems. The user of the trace facility selects either the program counter option or the stack unwind option, which may be accomplished by enabling one major code or another major code, as described further below. This timer interrupt is employed to sample information from a call stack. By walking back up the call stack, a complete call stack can be obtained for analysis. A "stack walk" may also be described as a "stack unwind", and the process of "walking the stack" may also be described as "unwinding the stack." Each of these terms illustrates a different metaphor for the process. The process can be described as "walking" as the process must obtain and process the stack frames step-by-step or frame-by-frame. The process may also be described as "unwinding" as the process must obtain and process the stack frames that point to one another, and these pointers and their information must be "unwound" through many pointer dereferences.

The stack unwind follows the sequence of functions/ method calls at the time of the interrupt. A call stack is an ordered list of routines plus offsets within routines (i.e. modules, functions, methods, etc.) that have been entered during execution of a program. For example, if routine A calls routine B, and then routine B calls routine C, while the processor is executing instructions in routine C, the call stack is ABC. When control returns from routine C back to routine B, the call stack is AB. For more compact presentation and ease of interpretation within a generated report, the names of the routines are presented without any information about offsets. Offsets could be used for more detailed analysis of the execution of a program, however, offsets are not considered further herein.

Thus, during timer interrupt processing or at post-processing, the generated sample-based profile information reflects a sampling of call stacks, not just leaves of the possible call stacks, as in some program counter sampling techniques. A leaf is a node at the end of a branch, i.e. a node that has no descendants. A descendant is a child of a parent node, and a leaf is a node that has no children.

With reference now FIG. 8, a diagram depicts the call stack containing stack frames. A "stack" is a region of reserved memory in which a program or programs store status data, such as procedure and function call addresses, passed parameters, and sometimes local variables. A "stack frame" is a portion of a thread's stack that represents local storage (arguments, return addresses, return values, and local variables) for a single function invocation. Every active thread of execution has a portion of system memory allocated for its stack space. A thread's stack consists of sequences of stack frames. The set of frames on a thread's stack represent the state of execution of that thread at any time. Since stack frames are typically interlinked (e.g., each stack frame points to the previous stack frame), it is often possible to trace back up the sequence of stack frames and develop the "call stack". A call stack represents all not-yet-completed function calls—in other words, it reflects the function invocation sequence at any point in time.

Call stack 800 includes information identifying the routine that is currently running, the routine that invoked it, and so on all the way up to the main program. Call stack 800 includes a number of stack frames 802, 804, 806, and 808. In the depicted example, stack frame 802 is at the top of call stack 800, while stack frame 808 is located at the bottom of call stack 800. The top of the call stack is also referred to as the "root". The timer interrupt (found in most operating systems) is modified to obtain the program counter value (pcv) of the interrupted thread, together with the pointer to the currently active stack frame for that thread. In the Intel architecture, this is typically represented by the contents of registers: EIP (program counter) and EBP (pointer to stack frame). By accessing the currently active stack frame, it is possible to take advantage of the (typical) stack frame linkage convention in order to chain all of the frames together. Part of the standard linkage convention also dictates that the function return address be placed just above the invoked-function's stack frame; this can be used to ascertain the address for the invoked function. While this discussion employs an Intel-based architecture, this example is not a restriction. Most architectures employ linkage conventions that can be similarly navigated by a modified profiling interrupt handler.

When a timer interrupt occurs, the first parameter acquired is the program counter value. The next value is the pointer to the top of the current stack frame for the interrupted thread. In the depicted example, this value would point to EBP 808a in stack frame 808. In turn, EBP 808 points to EBP 806a in stack frame 806, which in turn points to EBP 804a in stack frame 804. In turn, this EBP points to EBP 802a in stack frame 802. Within stack frames 802–808 are EIPs 802b–808b, which identify the calling routine's return address. The routines may be identified from these addresses. Thus, routines are defined by collecting all of the return addresses by walking up or backwards through the stack.

With reference now to the FIG. 9, an illustration of a call stack is depicted. A call stack, such as call stack 900 is obtained by walking the call stack. A call stack is obtained each time a periodic event, such as, for example, a timer interrupt occurs. These call stacks may be stored as call stack unwind trace records (also called merely "stack unwinds") within the trace file for post-processing or may be processed on-the-fly while the program continues to execute.

In the depicted example, call stack 900 contains a pid 902, which is the process identifier, and a tid 904, which is the thread identifier. Call stack 900 also contains addresses addr1 906, addr2 908 . . . addrN 910. In this example, addr1 906 represents the value of the program counter at the time of the interrupt. This address occurs somewhere within the scope of the interrupted function. addr2 908 represents an address within the process that called the function that was interrupted. For Intel-processor-based data processing systems, it represents the return address for that call; decrementing that value by 4 results in the address of the actual call, also known as the call-site. This corresponds with EIP 808b in FIG. 8; addrN 910 is the top of the call stack (EIP 802b). The call stack that would be returned if the timer interrupt interrupted the thread whose call stack state is depicted in FIG. 8 would consist of: a pid, which is the process id of the interrupted thread; a tid, which is the thread id for the interrupted thread; a pcv, which is a program counter value (not shown on FIG. 8) for the interrupted thread; EIP 808*b*; EIP 806*b*; EIP 804*b*; and EIP 802*b*. In terms of FIG. 9, pcv=addr1, EIP 808*b*=addr2, EIP 806*b*=addr3, EIP 804*b*=addr4, EIP 802*b*=addr5.

With reference now to FIG. 10, a diagram of a program execution sequence along with the state of the call stack at each function entry/exit point is provided. The illustration shows entries and exits occurring at regular time intervals, but this is only a simplification for the illustration. If each function (A, B, C, and X in the figure) were instrumented with entry/exit event hooks, then complete accounting of the time spent within and below each function would be readily obtained. Note in FIG. 10 that at time 0, the executing thread is in routine C. The call stack at time 0 is C. At time 1, routine C calls routine A, and the call stack becomes CA and so on. It should be noted that the call stack in FIG. 10 is a reconstructed call stack that is generated by processing the event-based trace records in a trace file to follow such events as method entries and method exits.

It should be appreciated that the entire call stack is not always ascertainable. That is, it may be difficult to determine the caller of an interrupted routine at the time of the interruption because the context of the interrupt handler and the context of the routine being sampled are different. Trying to follow the stack of the interrupted routine may require that memory pages be read in. This may be a problem while the processor is executing at an interrupt level because other interrupts required for disk access completion may be inhibited and cannot complete. In addition, not all programs follow the coding conventions required to make the call stack traversal correct.

The present invention provides a mechanism for dynamic instrumentation of code in which the entire call stack need not be known. In fact, the dynamic instrumentation mechanisms of the present invention operate on one level of the call stack at a time. A "hot spot" method or routine is first identified and instrumented to pass control to an interrupt handler that identifies a caller of the "hot spot" method or routine. The caller is then instrumented. Thus, the call stack need not be known and a mechanism is provided for identifying the caller of a method or routine one level up in the call stack.

As previously mentioned, the present invention provides an apparatus and method for the dynamic instrumentation of code to minimize system perturbation during tracing of the execution of the code. In a preferred embodiment, the present invention operates as a daemon process that executes in a background of a trace of the execution of a program. In this way, as the trace is being performed, trace information in a trace buffer or trace file may be analyzed by the present invention to identify "hot spots," callers of "hot spots" and instrument these "hot spots" and callers.

With the apparatus and method of the present invention, "hot spots" in the execution of the code are dynamically determined during tracing of the execution of the code. A "hot spot" in the execution of code is a portion of code that is either executed a many times compared to other portions of the code, a portion of code that consumes a large amount of processing cycles compared to other portions of code, or the like. Hot spot detection is generally known in the art and any known or later developed mechanism for the identification of hot spots may be used without departing from the spirit and scope of the present invention.

For example, in a preferred embodiment, the Tprof mechanism, in which program counter sampling is performed, may be used to identify hot spots in the execution of a program. With the Tprof, or other sampling based tracing mechanisms, for tracing the execution of a program, when a sample occurs, the instrumentation software identifies the address of the interrupted routine. The address is used to access a table, where the count for each tick at that address is incremented. Hash tables may be used to maintain the table of addresses. In some cases, where the range of addresses tends to be small, an index into a table may be constructed from the address. For each address identified by sampling, a count of occurrences at those addresses is maintained. It is this count of occurrences that is used to identify hot spots in the execution of the program.

After sampling has been in process for a predetermined period of time, the dynamic instrumentation facility, reads the tables and converts the addresses to the symbolic names of the functions associated with the addresses. An example mechanism for the conversion of addresses to symbolic names is described in commonly assigned and co-pending U.S. patent application Ser. No. 09/613,101 entitled "Apparatus and Method for Creating an Indexed Database of Symbolic Data for Use with Trace Data of a Computer Program." The basic approach to obtaining symbolic names from addresses is to capture the information related to all loaded modules at start up time and to continue updating this information as new loads take place.

The dynamic support, i.e. updating of the loaded module information, is especially important with JITted code as such code tends to be dynamic. For JITted code as methods are JITted, a profiler attached to the JVM receives events as each method is JITted via the Java Virtual Machine Profiling Interface (JVMPI) which identifies the method block, load address, and length of the method. Although methods are often reJITed, the space for the old methods does not tend to be reused until the entire class is unloaded. For this reason, the last method identified for each address range is used to resolve the mapping from address to symbolic name. For executables, the process and address can be used to identify the executable and displacement within the executable. The address to symbolic name mapping facility then reads the executable or the symbolic information related to the executable to determine the function being executed at that address. By mapping the addresses to processes/modules/functions, the dynamic instrumentation facility now has a table of functions with counts of number of occurrences of samples in each function.

If the percentage of occurrences in a function or set of functions (compared to other functions) reaches a predetermined threshold, then the functions are deemed candidates for the dynamic instrumentation of the present invention, i.e. the functions are deemed to be "hot spots." If there are no functions that reach the desired percentages, then some predetermined number of functions that have the highest counts can be used for the dynamic instrumentation.

When a hot spot is detected using a hot spot detection mechanism, such as the Tprof mechanism noted above, a caller of the hot spot method or routine (hereafter only referred to as a method for simplicity), is identified and instrumented for characteristics of interest. The identification of the caller of the hot spot method may be performed in different ways depending on the type of code, e.g., native, jitted or interpreted code, of the hot spot method.

For native or jitted code, the hot spot method is simply instrumented by the insertion of a hook that transfers control to a handler that identifies the caller of the method in which the hot spot is detected. The inserting of a hook of this type may be performed, for example, by patching in a call to a handler routine.

One approach to instrumenting code, i.e. insertion of a hook into code, that may be used by the dynamic instrumentation facility of the present invention is to maintain a table which represents the address and code that is replaced for each function being modified. The code at the entry to the function is copied to the table identifying the address of the code being modified and a copy of the code that is being replaced. The code is then replaced by an instruction that causes a break or interrupt (for example an int 3 on Intel x86 processors and a break instruction on IA64 processors).

When the code is executed, the break or exception handler determines that the occurrence of the exception is due to inserted code (the address of where the break occurred is available to the handler). The handler then determines which code was being executed, restores the code and uses a single step handler to execute the restored instruction. The single step handler then determines that the code of interest was just restored and then puts back the int 3 or other code so that the next time it is executed, the exception will occur.

Another approach is to simply modify the code to jump to a handler that is aware of the code that is modified and causes the replaced instruction to be executed. Such an approach may require careful modification of relative addresses if the instruction being replaced is not directly relocatable.

When the hook is executed during execution of this hot spot method, control is passed to the handler method that performs the functions of identifying the caller of the hot spot method. When the dynamic instrumentation facility obtains control from the hooked or changed code, it can determine the caller by a variety of means. If it obtains control at the entry, then the call stack will have the return address at a known displacement within the call stack. In other processor architectures, the caller may be in a register. If the code is badly behaved, it is possible that the caller may be incorrect. However, even in this case, the caller of the caller will most likely be identified and this should give acceptable results.

The dynamic instrumentation facility may also determine the amount of time that the function has been executing. It may do this by changing the returns (exits), using the same technique as with the entries, or it may do this by modifying the return information so that the dynamic instrumentation facility gets control when the return occurs, and thereby can record the desired information. Of course the techniques similar to the instrumentation at entry can be used to ensure that the dynamic instrumentation returns control to the real caller after it has completed its processing of the return.

If the code of the hot spot method is interpreted, the information about the hot spot, e.g., the thread identifier and method block address, may be passed to a Java profiler routine connected to the Java Virtual Machine (JVM). The JVM may enable an instrumented JVM to selectively cause the class/method of the hot spot to call out to the Java profiler on entry to the method. The profiler can then determine the caller of the method by requesting the caller information from a driver application that investigates the call stack to identify a caller of the hot spot method.

Alternatively, if the code of the hot spot method is interpreted, the byte codes of the method may be changed to insert the necessary instrumentation, e.g., a hook, to a method that identifies the caller of the hot spot method from the call stack. With such an implementation, at the time a class is loaded, the bytecode of the class is changed to insert the hook. This approach requires the instrumentation to occur on a separate run or runs.

Alternatively, the instrumentation may be inserted, but not turned on at the time the class is loaded. The instrumented code may be instrumented such that a flag is set or reset to control the firing of the hook. A different flag may be used for each method, so that the control of firing the hook is at the method level. The update of the flags are done via native methods by the profiler. Thus, the profiler dynamically changes the values of the flags as determined by the instrumentation facility.

Whether the native or jitted code is instrumented by patching a hook into the code, interpreted code is instrumented by use of a profiler or changing of byte code, or the like, the method that called the "hot spot" method, hereafter referred to as the "caller" method, is identified and is dynamically instrumented For an appropriate metric or characteristic, e.g., wall clock time, cycles, number of instructions, or the like. The next time the calling method is executed, the dynamically inserted hooks are executed.

In addition, once the caller method is instrumented in this fashion, if a hook was inserted into the hot spot method to identify this caller method, this hook may be removed in order to maintain the number of hooks inserted in the code at a minimum. The removal of a hook is generally known in the art. For example, a hook may be removed from code by restoring the original code and removing the entries from the instrumentation facilities or in the case of Java, by turning off the flags that control the firing of the hooks.

The execution of the hooks in the caller method may be continued for a predetermined period to get an understanding of the caller method's characteristics. The predetermined period may be, for example, a predetermined number of invocations of the caller method, a predetermined number of clock cycles, a predetermined wall clock time, or the like. When this predetermined period is expired, the call stack is walked up to the next level of caller method and the caller of the currently instrumented caller method is then instrumented.

In other words, the present invention maintains a list of callers of instrumented methods. When the predetermined period for executing inserted hooks in a caller method has expired, the list of callers is read and used to determine one or more calling methods of the instrumented caller method. One or more of these calling methods are then instrumented by the insertion of hooks to measure given metrics. In addition, the hooks inserted in the instrumented caller method (called by the one or more calling methods), are removed. In this way, the call stack is walked up a single level at a time and instrumented to identify characteristics of the execution of a program over time. As a result, it is not necessary to instrument an entire call stack to obtain the trace information of interest.

In addition, with the present invention, the number of hooks that are executed during tracing of a program is minimized by reducing the number of hooks required to be inserted prior to the workload being executed and keeping the number of hooks that are dynamically inserted to a minimum. The number of hooks that are dynamically inserted is minimized by performing dynamic instrumentation based on detected hot spots and by removing inserted hooks from methods when one of its calling methods is instrumented.

Figure 11:
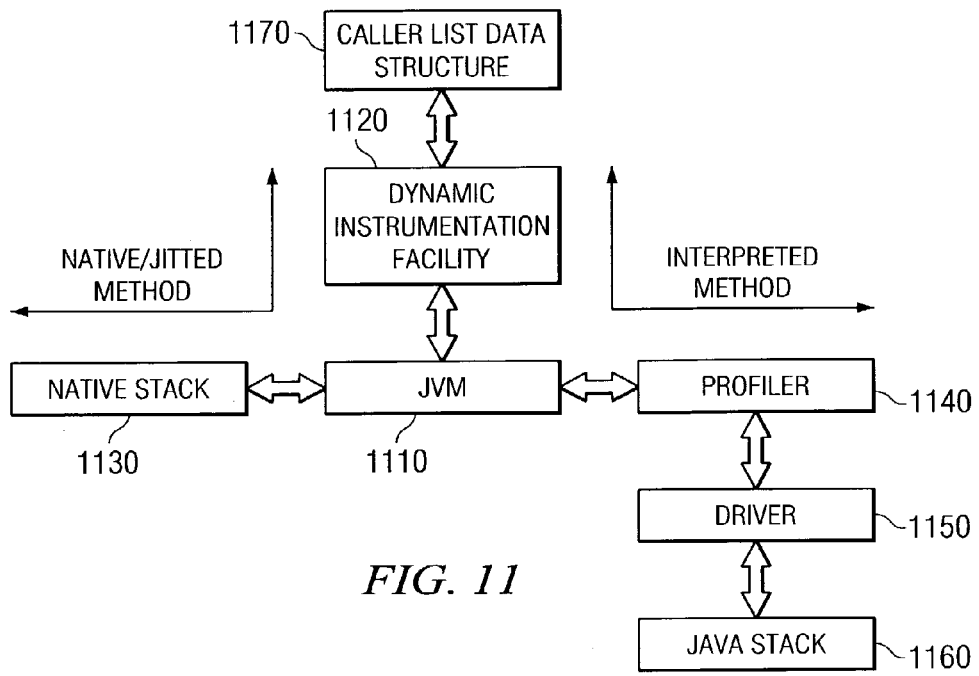
FIG. 11 is a an exemplary diagram illustrating a the primary operational elements of the present invention.

FIG. 11 is an exemplary diagram illustrating the primary operational elements of the present invention. As shown in FIG. 11, the primary operational elements of the present invention include a Java Virtual Machine (JVM) 1110, a dynamic instrumentation facility 1120, a native stack 1130, a profiler 1140, a driver 1150, a Java stack 1160, and a caller list data structure 1170. The core of the present invention lies in the dynamic instrumentation facility 1120 which performs the functions of hot spot detection and dynamic instrumentation of caller methods. The JVM 1110, native stack 1130, profiler 1140, driver 1150 and Java stack 1160 are used to identify a caller of a hot spot method. The caller list data structure 1170 is used to identify a calling method of a currently instrumented caller method in order to walk up the call stack.

With the present invention, a trace tool 1100 is used to trace the execution of a program. The dynamic instrumentation facility 1120 is part of this trace tool 1100 and performs the functions of hot spot detection. When a hot spot is detected, a determination is made as to whether the hot spot is native or jitted code, or interpreted code. If it is determined that the hot spot method is native or jitted code, the dynamic instrumentation facility patches a hook into the hot spot method that passes control to a handler routine.

The handler routine determines a caller of the hot spot method from the native stack 1130 and passes this information back to the dynamic instrumentation facility 1120. The dynamic instrumentation facility then instruments the caller method by, for example, patching in hooks to routines that measure metrics or characteristics of the execution of the instrumented method.

If the hot spot method is interpreted code, then the dynamic instrumentation facility passes control to the JVM which is instrumented to cause the hot spot method to call the profiler 1140 which determines the caller of the hot spot method using the driver 1150. The driver 1150 searches the Java stack 1180 to identify the caller method of the hot spot method and returns this information to the profiler 1140. The profiler 1140 then returns this information to the dynamic instrumentation facility 1120 via the JVM 1110. The dynamic instrumentation facility 1120 then instruments the caller method.

In addition to hot spot detection and instrumentation of callers of hot spot methods, the dynamic instrumentation facility 1120 also monitors the periods which an instrumented caller method has executed hooks. For example, the dynamic instrumentation facility 1120 may store in the caller list data structure 1170 an identification of caller methods, an identification of whether the caller method has been dynamically instrumented, as well as a count of the number of times the caller method's hooks have been executed. The count may be compared to a predetermined threshold to determine if the metrics measured by the routines associated with the hooks have been measured for a sufficient period so as to obtain information about the execution characteristics of the caller method.

If the predetermined threshold is met, the caller list data structure 1170 is consulted by the dynamic instrumentation facility 1120 to identify one or more calling methods of the instrumented caller method. One or more of these calling methods are then instrumented and the hooks in the currently instrumented caller method are removed by the dynamic instrumentation facility 1120. The hooks may be removed by consulting the tables generated during the insertion of the hooks, discussed previously, to perform a reverse operation to restore the code to its original state.

Figure 12:
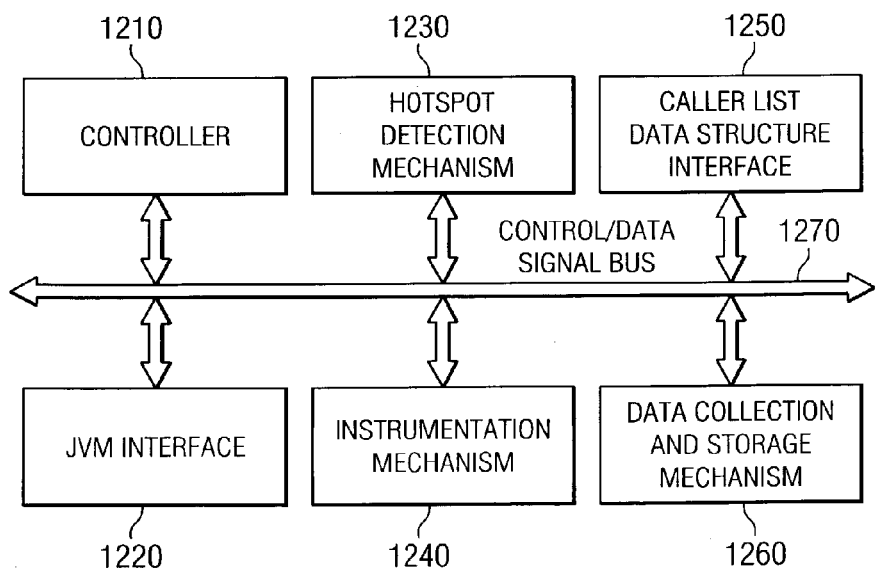
FIG. 12 is an exemplary block diagram of a dynamic instrumentation facility according to the present invention.

FIG. 12 is an exemplary block diagram of a dynamic instrumentation facility according to the present invention. The elements shown in FIG. 12 may be implemented in hardware, software, or any combination of hardware and software. In a preferred embodiment, the elements of FIG. 12 are implemented as software instructions executed by one or more processors.

As shown in FIG. 12, the dynamic instrumentation facility includes a controller 1210, a JVM interface 1220, a hot spot detection mechanism 1230, an instrumentation mechanism 1240, a caller list data structure interface 1250 and a data collection and storage mechanism 1260. The elements 1210–1260 are in communication with one another via a control/data signal bus 1270. Although a bus architecture is shown in FIG. 12, the present invention is not limited to such and any architecture may be used that facilitates communication of control/data signals between the elements 1210–1260 without departing from the spirit and scope of the present invention.

The controller 1210 controls the overall operation of the dynamic instrumentation facility and orchestrates the operation of the other elements 1220–1260. The JVM interface 1220 provides an interface to the Java Virtual Machine. The hot spot detection mechanism 1230 performs hot spot detection using any of a number of different hot spot detection algorithms.

When the hot spot detection mechanism detects the presence of a hot spot in the execution of a program under trace, the hot spot detection mechanism informs the instrumentation mechanism 1240 of the existence of the hot spot and the identity of the method in which the hot spot is detected. The instrumentation mechanism 1240 then determines the caller method of the hot spot method, using one of the various techniques discussed above based on the type of code (native, jitted, or interpreted) for the hot spot method. The instrumentation mechanism 1240 then instruments the caller method for monitoring purposes and adds an entry to the caller list data structure via the caller list data structure interface 1250 for the caller method.

This entry may include, for example, an identification of the caller method, an indication that the caller method has been instrumented, and a count of the number of times that the caller method has been executed following instrumentation of the caller method. The entry may further include an identification of methods called by the caller method and methods that call the caller method. For example, the caller list data structure may take the form of a linked list or doubly linked list.

The dynamic instrumentation facility, or other portions of the trace tool, performs a trace of the program execution and collect data on the metrics of interest for characterizing the execution of the program. This data collection and storage is performed by the data collection and storage mechanism 1260. As each instrumented method is executed during the trace, the count for the method in the caller list data structure is incremented.

The instrumentation mechanism 1240 monitors the counts for each of the caller methods identified in the caller list data structure to determine if any count exceeds a predetermined threshold. If so, the instrumentation mechanism 1240 reads the caller list data structure via the caller list data structure interface 1250 to determine the identity of one or more calling methods of the caller method, if any. This may be done, for example, by looking at the identifications of the methods that call the caller method or following the links in the linked list to the next calling method up the chain of links. It should be noted that the identification of a calling method of the caller method only traverses one level in the call stack and does not require identification of each calling method in the chain of method calls used to reach the caller method.

One or more of the calling methods are instrumented by the instrumentation mechanism 1240 and the instrumentation that was added to the caller method is removed. In this way, the number of inserted hooks is maintained at a minimum level.

Figure 13:
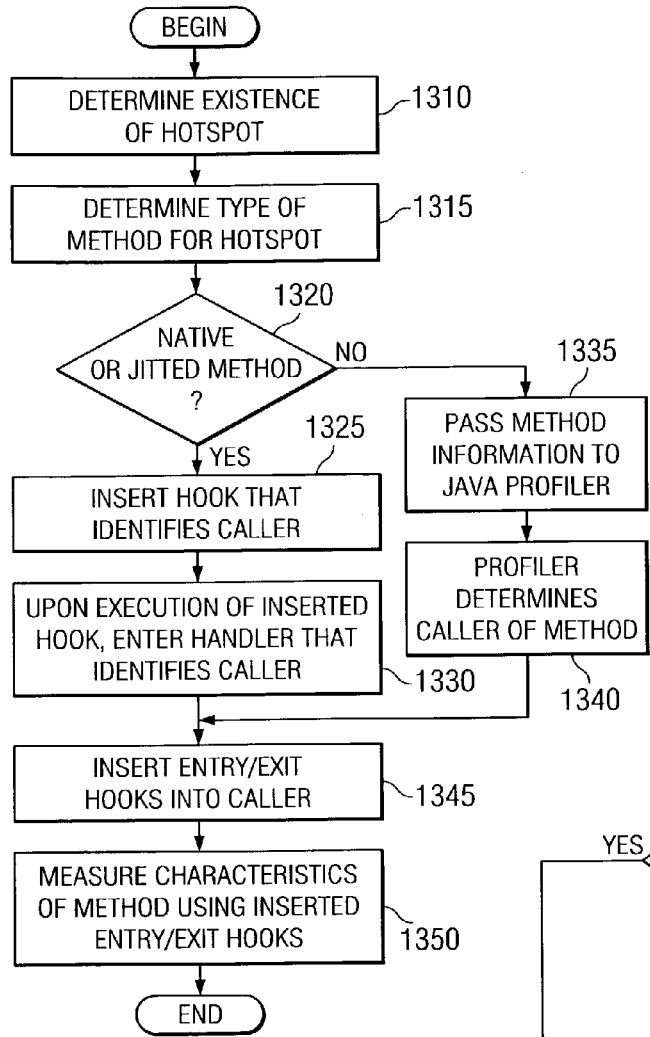
FIG. 13 is a flowchart outlining an exemplary process for dynamically instrumenting code according to the present invention.

FIG. 13 is a flowchart outlining an exemplary process for dynamically instrumenting code according to the present invention. As shown in FIG. 13, the operation starts with the determination of the existence of a hot spot (step 1310). The type of method code for the hot spot is then determined (step 1315). A determination is made as to whether the hot spot method code is native or jitted code (step 1320). If so, then a hook is inserted, e.g., through patching, into the hot spot method code (step 1325). Upon execution of the inserted hook, a handler method is entered that identifies the caller of the hot spot method (step 1330).

If the hot spot method code is not native or jitted, the method information is passed to an instrumented JVM and ultimately to a profiler (step 1335). The profiler determines the caller of the hot spot method, e.g., by using a driver that queries a Java stack, or call stack, to identify the caller method of the hot spot method (step 1340). Thereafter, entry/exit hooks that monitor a given metric are inserted into the caller method (step 1345). The metrics are then measured using the inserted entry/exit hooks in order to identify characteristics of the execution of the program (step 1350).

Figure 14:
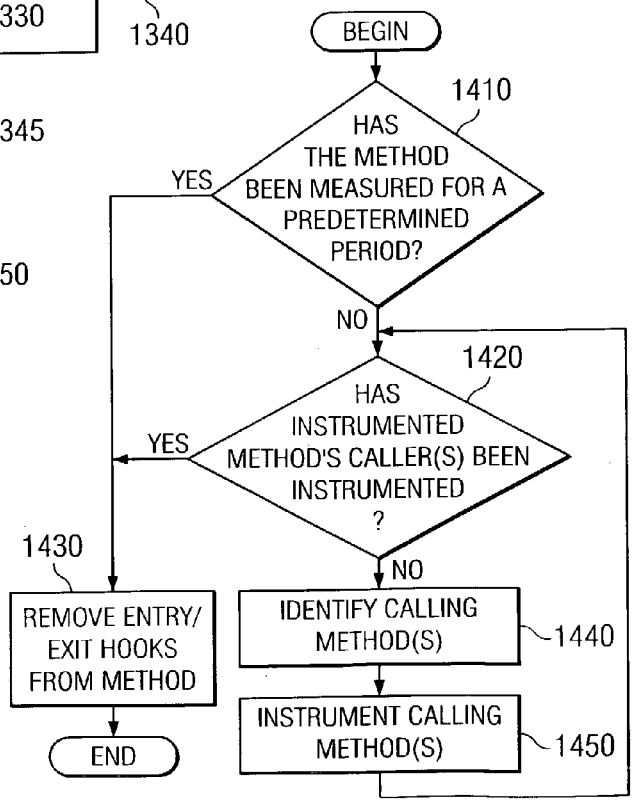
FIG. 14 is a flowchart outlining an exemplary process for removal of dynamically inserted hooks according to the present invention.

FIG. 14 is a flowchart outlining an exemplary process for removal of dynamically inserted hooks according to the present invention. As shown in FIG. 14, the operation starts with a determination as to whether the metrics of the instrumented method have been measured for a predetermined period (step 1410). If not, the operation ends. Otherwise, a determination is then made as to whether one or more callings method of the instrumented method have been instrumented (step 1420). If so, the inserted entry/exit hooks are removed from the instrumented method (step 1430). If one or more of the calling methods of the instrumented method have not been instrumented, the calling methods are identified (step 1440) and one or more of the calling methods are instrumented (step 1450). The operation then returns to step 1420.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of instrumenting code for tracing of a program, comprising:
   identifying a hot spot method of the program:
   identifying a caller method that calls the hot spot method;
   instrumenting the caller method by inserting one or more hooks into the caller method;
   measuring at least one execution characteristic metric using the inserted one or more hooks in the caller method;
   determining if the at least one execution characteristic metric has been measured for a predetermine period; and
   if the at least one execution characteristic metric has been measured for a predetermined period of time;
      identifying at least one calling method that calls the caller method;
      instrumenting the at least one calling method; and
      removing the one or more hooks from the caller method;
   storing the at least one execution characteristic metric in a storage mechanism for analyzing execution of the program and system resource usage.

2. The computer implemented method of claim 1, wherein identifying a caller method that calls the hot spot method includes:
   inserting a hook into the hot spot method, wherein the hook passes control of execution of the hot spot method to a handler method that identifies the caller method.

3. The computer implemented method of claim 1, wherein identifying a caller method that calls the hot spot method includes:
   passing hot spot method information to an instrumented Java Virtual Machine: and
   calling, via the Java Virtual Machine, a profiler associated with the Java Virtual Machine, wherein the profiler obtains the identity of the caller method from a Java stack.

4. The computer implemented method of claim 1, wherein identifying a caller method that calls the hot spot method includes determining if code of the hot spot method is native, jitted or interpreted.

5. The computer implemented method of claim 1, wherein identifying a hot spot method includes analyzing trace data during a trace of the program to identify a portion of code of the program that is either executed many times or consumes a large amount of processing cycles compared to other portions of code of the program.

6. The computer implemented method of claim 1, wherein identifying a hot spot method includes using program counter sampling to identify the hot spot method.

7. The computer implemented method of claim 6, wherein a hot spot method is identified as a method whose number of occurrences of samples in the method exceeds a threshold.

8. The computer implemented method of claim 3, wherein the hot spot method information includes a thread identifier and a method block address of the hot spot method.

9. The computer implemented method of claim 1, wherein identifying at least one calling method that calls the caller method includes:
   maintaining a list of calling methods that call the caller method;
   selecting one or more calling methods from the list of calling methods; and instrumenting the one or more calling methods.

10. The computer implemented method of claim 2, further comprising: removing the hook from the hot spot method once the caller method is instrumented.

11. A computer program product in a computer readable medium for instrumenting code for tracing of a program, comprising:
 first instructions for identifying a hot spot method of the program;
 second instructions for identifying a caller method that calls the hot spot method;
 third instructions for instrumenting the caller method by inserting one or more hooks into the caller method;
 fourth instructions for measuring at least one execution characteristic metric using the inserted one or more hooks in the caller method;
 fifth instructions for storing the at least one execution characteristic metric in a storage mechanism for analyzing execution of the program and system resource usage;
 sixth instructions for determining if the at least one execution characteristic metric has been measured for a predetermine period: and
 seventh instructions responsive to determine that at least one calling method has not been instrumented for performing the following;
  identifying at least one calling method that calls the caller method;
  instrumenting the at least one calling method; and
  removing the one or more hooks from the caller method.

12. The computer program product of claim 11, wherein the second instructions for identifying a caller method that calls the hot spot method include:
 instructions for inserting a hook into the hot spot method, wherein the hook passes control of execution of the hot spot method to a handler method that identifies the caller method.

13. The computer program product of claim 11, wherein the second instructions for identifying a caller method that calls the hot spot method include:
 instructions for passing hot spot method information to an instrumented Java Virtual Machine; and
 instructions for calling, via the Java Virtual Machine, a profiler associated with the Java Virtual Machine, wherein the profiler obtains the identity of the caller method from a Java stack.

14. The computer program product of claim 11, wherein the second instructions for identifying a caller method that calls the hot spot method include instructions for determining if code of the hot spot method is native, jitted or interpreted.

15. The computer program product of claim 11, wherein identifying a hot spot method includes using program counter sampling to identify the hot spot method.

16. The computer program product of claim 11, wherein identifying at least one calling method that calls the caller method includes:
 maintaining a list of calling methods that call the caller method;
 selecting one or more calling methods from the list of calling methods; and
 instrumenting the one or more calling methods.

17. The computer program product of claim 12, further comprising;
 instructions for removing the hook from the hot spot method once the caller method is instrumented.

18. An apparatus for instrumenting code for tracing of a program, comprising:
 means for identifying a hot spot method of the program;
 means for identifying a caller method that calls the hot spot method, wherein the means for identifying a caller method that calls the hot spot method includes:
  means for passing hot spot method information to an instrumented Java Virtual Machine, wherein the hot spot method information includes a thread identifier and a method block address of the hot spot method; and
  means for calling, via the Java Virtual Machine, a profiler associated with the Java Virtual Machine, wherein the profiler obtains the identity of the caller method from a Java stack;
 means for instrumenting the caller method by inserting one or more hooks into the caller method;
 means for measuring at least one execution characteristic metric using the inserted one or more hooks in the caller method; and
 means for storing the at least one execution characteristic metric for analyzing execution of the program and system resource usage.

19. A method of instrumenting code for tracing of a program, comprising:
 identifying a hot spot method of the program;
 identifying a caller method that calls the hot spot method by inserting a hook into the hot spot method, wherein the hook passes control of execution of the hot spot method to a handler method that identifies the caller method;
 instrumenting the caller method by inserting one or more hooks into the caller method;
 measuring at least one execution characteristic metric using the inserted one or more hooks in the caller method;
 storing the at least one execution characteristic metric in a storage mechanism for analyzing execution of the program and system resource usage; and
 removing the hook from the hot spot method once the caller method is instrumented.

* * * * *